(12) United States Patent
Wang et al.

(10) Patent No.: US 11,768,932 B2
(45) Date of Patent: Sep. 26, 2023

(54) SYSTEMS AND METHODS FOR FAST TRAINING OF MORE ROBUST MODELS AGAINST ADVERSARIAL ATTACKS

(71) Applicant: Baidu USA, LLC, Sunnyvale, CA (US)

(72) Inventors: Jianyu Wang, Santa Clara, CA (US); Haichao Zhang, Sunnyvale, CA (US)

(73) Assignee: Baidu USA LLC, Sunnyvale, CA (US)

( * ) Notice: Subject to any disclaimer, the term of this patent is extended or adjusted under 35 U.S.C. 154(b) by 251 days.

(21) Appl. No.: 16/457,781

(22) Filed: Jun. 28, 2019

(65) Prior Publication Data

US 2020/0410228 A1    Dec. 31, 2020

(51) Int. Cl.

| | |
|---|---|
| *G06F 18/214* | (2023.01) |
| *G06V 30/19* | (2022.01) |
| *G06V 10/82* | (2022.01) |
| *G06N 3/08* | (2023.01) |
| *G06F 21/55* | (2013.01) |
| *G06N 3/04* | (2023.01) |
| *G06F 21/56* | (2013.01) |
| *G06V 30/413* | (2022.01) |

(52) U.S. Cl.
CPC ............ *G06F 21/55* (2013.01); *G06F 18/214* (2023.01); *G06F 21/565* (2013.01); *G06N 3/04* (2013.01); *G06V 10/82* (2022.01); *G06V 30/1916* (2022.01); *G06V 30/19173* (2022.01); *G06V 30/413* (2022.01); *G06N 3/08* (2013.01)

(58) Field of Classification Search
CPC .... G06K 9/00456; G06K 9/6256; G06N 3/02; G06N 3/04; G06N 3/08; G06N 3/086; G06N 3/088; G06F 21/565
See application file for complete search history.

(56) References Cited

U.S. PATENT DOCUMENTS

2017/0132512 A1*   5/2017   Ioffe ..................... G06N 3/08

OTHER PUBLICATIONS

Szegedy et al., "Rethinking the Inception Architecture for Computer Vision", Jun. 2016, IEEE, 2016 IEEE Conference on Computer Vision and Pattern Recognition (CVPR), p. 2818-2826 (Year: 2016).*

(Continued)

*Primary Examiner* — Vincent Rudolph
*Assistant Examiner* — Timothy Choi
(74) *Attorney, Agent, or Firm* — NORTH WEBER & BAUGH LLP

(57) ABSTRACT

Described herein are embodiments for fast training of adversarially robust models against adversarial attacks. Embodiments for model training by perturbing both the image and the label, which may be referred to as Bilateral Adversarial Training (BAT), are disclosed. To generate the adversarial label, one or more closed-form heuristic solutions are derived. One-step targeted attack is used with the target label being the most confusing class. It is shown in various experiments that random start and the most confusing target attack effectively prevent the label leaking and gradient masking problem. Coupled with the adversarial label part, embodiments of presented models significantly improve the state-of-the-art results. Experiments on one or more computationally challenging dataset also demonstrate the effectiveness of the presented BAT method embodiments.

20 Claims, 7 Drawing Sheets

(56) References Cited

OTHER PUBLICATIONS

Chang et al., "Efficient Two-Step Adversarial Defense for Deep Neural Networks", Oct. 2018, arXiv.org, <https://arxiv.org/abs/1810.03739>, p. 1-16. (Year: 2018).*
Jang et al., "Objective Metrics and Gradient Descent Algorithms for Adversarial Examples in Machine Learning", Dec. 2017, ACM, ACSAC 2017: Proceedings of the 33rd Annual Computer Security Applications Conference, p. 262-277. (Year: 2017).*
Paudice et al., "Label Sanitization against Label Flipping Poisoning Attacks", Oct. 2018, arXiv.org, <https://arxiv.org/abs/1803.00992>, p. 1-11. (Year: 2018).*
Nicolae et al., "Adversarial Robustness Toolbox v0.4.0", Jan. 11, 2019, arXiv.org, <https://arxiv.org/abs/1807.01069v3>, p. 1-41. (Year: 2019).*
Zantedeschi et al., "Efficient Defenses Against Adversarial Attacks", Nov. 2017, ACM, Proceedings of the 10th ACM Workshop on Artificial Intelligence and Security, p. 39-49. (Year: 2017).*
Papernot et al.,"Practical black-box attacks against machine learning," arXiv preprint arXiv:1602.02697, 2017. (14pgs).
Papernot et al.,"Distillation as a defense to adversarial perturbations against deep neural networks," arXiv preprint arXiv:1511.04508, 2016. (16pgs).
Pinto et al.,"Robust adversarial reinforcement learning," arXiv preprint arXiv:1703.02702, 2017. (10pgs).
Prakash et al.,"Deflecting adversarial attacks with pixel deflection," arXiv preprint arXiv:1801.08926, 2018. (17pgs).
Raghunathan et al.,"Certified defenses against adversarial examples," arXiv preprint arXiv:1801.09344, 2018. (15pgs).
Ross et al.,"Improving the Adversarial Robustness and Interpretability of Deep NeuralNetworks by Regularizing their Input Gradients,"arXiv preprint arXiv:1711.09404, 2017.(10).
Samangouei et al.,"Defense-GAN: Protecting classifiers against adversarial attacks using generative models," arXiv preprint arXiv:1805.06605, 2018. (17pgs).
Schmidt et al.,"Adversarially robust generalization requires more data," arXiv preprint arXiv:1804.11285, 2018. (39pgs).
Sinha et al.."Certifying some distributional robustness with principled adversarial training,"arXiv preprint arXiv:1710.10571, 2018. (41 pgs).
Song et al.,"Pixeldefend: Leveraging generative models to understand and defend against adversarial examples,"arXiv preprint arXiv:1710.10766, 2018. (20pgs).
Athalye et al.,"Obfuscated gradients give a false sense of security: Circumventing defenses to adversarial examples," arXiv preprint arXiv:1802.00420, 2018. (12pgs).
Athalye et al.,"Synthesizing robust adversarial examples," arXiv preprint arXiv:1707.07397, 2018. (19pgs).
Biggio et al.,"Evasion attacks against machine learning at test time." arXiv preprint arXiv:1708.06131, 2017. (16pgs).
Biggio et al.,"Wild patterns: Ten years after the rise of adversarial machine learning," arXiv preprint arXiv:1712.03141, 2018. (17pgs).
Brendel et al.,"Decision-based adversarial attacks: Reliable attacks against black-box machine learning models," arXiv preprint arXiv:1712.04248, 2018. (12pgs).
Carlini et al.,"Adversarial examples are not easily detected: Bypassing ten detection methods," arXiv preprint arXiv:1705.07263, 2017. (12pgs).
Carlini et al.,"Towards evaluating the robustness of neural networks," arXiv preprint arXiv:1608.04644, 2017. (19pgs).
Chen et al.,"Attacking visual language grounding with adversarial examples: A case study on neural image captioning," arXiv preprint arXiv: 1712.02051, 2018. (16pgs).
Chen et al.,"EAD:Elastic-Net attacks to deep neural networks via adversarial examples," arXiv preprint arXiv:1709.04114, 2018. (19pgs).
Chen et al.,"ZOO: Zeroth order optimization based black-box attacks to deep neural networks without training substitute models," arXiv preprint arXiv:1708.03999, 2017. (13pgs).
He et al.,"Identity mappings in deep residual networks," arXiv preprint arXiv:1603.05027, 2016. (15pgs).
Hochreiter et al.,"Flat Minima," Neural Computation, 9(1), 1997. (38pgs).
Huang et al.,"Adversarial machine learning," In ACM workshop on Security and artificial intelligence, 2011. (15pgs).
Huang et al.,"Adversarial attacks on neural network policies," arXiv preprint arXiv:1702.02284, 2017. (10pgs).
Jakubovitz et al.,"Improving DNN robustness to adversarial attacks using Jacobian regularization," arXiv preprint arXiv:1803.08680, 2019. (26 pgs).
Kannan, et al.,"Adversarial logit pairing," arXiv preprint arXiv:1803.06373, 2018. (10 pgs).
Krizhevsky et al.,"Learning multiple layers of features from tiny images," [online], [Retrieved Aug. 15, 2020]. Retrieved from Internet <URL:. https://www.cs.toronto.edu/~kriz/learning-features-2009-TR.pdf>, Technical report, 2009. (60pgs).
Kurakin et al.,"Adversarial examples in the physical world," arXiv preprint arXiv:1607.02533, 2017. (14pgs).
Kurakin et al.,"Adversarial machine learning at scale," arXiv preprint arXiv:1611.01236, 2017. (17pgs).
Lecun et al.,"Gradientbased learning applied to document recognition," In Proceedings of the IEEE, 86(11), 1998. (46pgs).
Liao et al.,"Defense against adversarial attacks using high-level representation guided denoiser," arXiv preprint arXiv:1712.02976, 2018. (10pgs).
Liu et al.,"Towards robust neural networks via random self-ensemble," arXiv preprint arXiv:1712.00673, 2018. (17pgs).
Liu et al.,"Delving into transferable adversarial examples and black-box attacks," arXiv preprint arXiv:1611.02770, 2017. (24pgs).
Madry et al.,"Towards deep learning models resistant to adversarial attacks," arXiv preprint arXiv: 1706.06083, 2017. (27pgs).
Meng et al.,"MagNet: a two-pronged defense against adversarial examples," arXiv preprint arXiv:1705.09064, 2017. (13pgs).
Metzen et al.,"On detecting adversarial perturbations," arXiv preprint arXiv:1702.04267, 2017. (12pgs).
Metzen et al.,"Universal adversarial perturbations against semantic image segmentation," arXiv preprint arXiv:1704.05712, 2017. (17pgs).
Moosavi-Dezfooli et al.,"Deepfool:a simple and accurate method to fool deep neural networks," arXiv preprint arXiv:1511.04599, 2016. (9pgs).
Netzer et al.,"Reading digits in natural images with unsupervised feature learning," In NIPS Workshop on Deep Learning and Unsupervised Feature Learning, 2011. (9pgs).
Cisse et al.,"Houdini: Fooling deep structured prediction models," arXiv preprint arXiv:1707.05373, 2017. (12pgs).
Dalvi et al.,"Adversarial classification," In ACM SIGKDD Conference on Knowledge Discovery and Data Mining, 2004. (10pgs).
Deng et al.,"Imagenet: A large-scale hierarchical image database," In Computer Vision and Pattern Recognition, 2009. (9pgs).
Dinh et al.,"Sharp minima can generalize for deep nets," arXiv preprint arXiv:1703.04933, 2017. (13pgs).
Dong et al.,"Boosting adversarial attacks with momentum," arXiv preprint arXiv:1710.06081, 2018. (12pgs).
Dubey et al.,"Defense Against Adversarial Images using Web-Scale Nearest-Neighbor Search," arXiv preprint arXiv:1903.01612, 2019. (14pgs).
Engstrom et al.,"A Rotation and a Translation Suffice:Fooling CNNs with Simple Transformations," arXiv preprint arXiv:1712.02779, 2018. (18pgs).
Evtimov et al.,"Robust physical-world attacks on deep learning models," arXiv preprint arXiv:1707.08945, 2017. (14pgs).
Goodfellow et al.,"Explaining and harnessing adversarial examples," arXiv preprint arXiv:1412.6572, 2015. (11 pgs).
Guo et al.,"Countering adversarial images using input transformations," arXiv preprint arXiv:1711.00117, 2018. (12pgs).
Szegedy et al.,"Rethinking the inception architecture for computer vision,"arXiv preprint arXiv:1512.00567, 2015. (10pgs).
Szegedy et al.,"Intriguing properties of neural networks," arXiv preprint arXiv:1312.6199, 2014. (10pgs).
Tram'er, et al.,"Ensemble adversarial training: Attacks and defenses," arXiv preprint arXiv:1705.07204, 2018. (20pgs).

(56) References Cited

OTHER PUBLICATIONS

Uesato et al.,"Adversarial risk and the dangers of evaluating against weak attacks,"arXiv preprint arXiv:1802.05666, 2018. (13pgs).
Xie et al.,"Mitigating adversarial effects through randomization," arXiv preprint arXiv:1711.01991, 2018. (16pgs).
Xie et al.,"Adversarial Examples for Semantic Segmentation and Object Detection," arXiv preprint arXiv:1703.08603, 2017. (12pgs).
Xie et al.,"Feature denoising for improving adversarial robustness," arXiv preprint arXiv:1812.03411, 2019. (9pgs).
Zagoruyko et al.,"Wide residual networks," arXiv preprint arXiv:1605.07146, 2017. (15pgs).
Zhang et al.,"Theoretically principled trade-off between robustness and accuracy," arXiv preprint arXiv:1901.08573, 2019. (31 pgs).
Wang et al.,"Bilateral Adversarial Training: Towards Fast Training of More Robust Models Against Adversarial Attacks," arXiv preprint arXiv:1811.10716, 2018. (11 pgs).

\* cited by examiner

400

SYSTEMS AND METHODS FOR FAST TRAINING OF MORE ROBUST MODELS AGAINST ADVERSARIAL ATTACKS

BACKGROUND

A. Technical Field

The present disclosure relates generally to systems and methods for training image model. More particularly, the present disclosure relates to systems and methods for fast training image model against adversarial attacks.

B. Background

Deep learning has achieved great success in many visual recognition tasks in computer vision. However, deep neural networks are extremely vulnerable to adversarial attacks. Specifically, the network may be easily fooled to make wrong predictions given adversarial examples, which are adversarially manipulated images by adding small and imperceptible perturbations. This poses a very challenging issue for deploying real-world machine learning systems. Therefore, training an adversarially robust model is of great value towards commercialized artificial intelligence (AI) technology.

Adversarial training has been used for image models. However, the effectiveness for adversarial training using adversarial images comes with expensive time cost or memory cost, which negatively affects the applicability of adversarial training.

Accordingly, what is needed are systems and methods for systems and methods for fast training robust image model against adversarial attacks.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

Figure ("FIG.") 1 depicts system architecture for bilateral adversarial training, according to embodiments of the present disclosure.

DETAILED DESCRIPTION OF EMBODIMENTS

Figure 1:
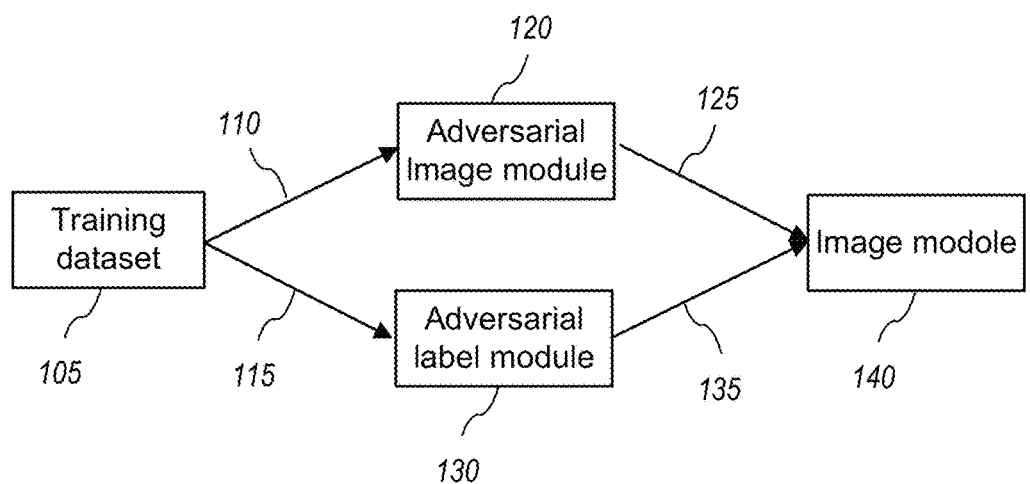

In the following description, for purposes of explanation, specific details are set forth in order to provide an understanding of the present disclosure. It will be apparent, however, to one skilled in the art that embodiments may be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the present disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. An image may be a still image or from a video.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporated by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

A. Introduction

Deep learning has achieved great success in many visual recognition tasks in computer vision. However, deep neural networks are extremely vulnerable to adversarial attacks. Specifically, the network may be easily fooled to make wrong predictions given adversarial examples, which are adversarially manipulated images by adding small and imperceptible perturbations. This poses a very challenging issue for deploying real-world machine learning systems. Therefore, training an adversarially robust model is of great value towards commercialized artificial intelligence (AI) technology.

Many approaches have been proposed recently to defend against adversarial examples. Multi-step adversarial training is currently one of the best defense methods. Specifically, adversarial training solves a minimax (saddle point) problem. The inner maximization generates adversarial examples by multi-step projected gradient descent (PGD), which are then used in the outer minimization to optimize the network parameters.

In the present patent document, to understand the working mechanism of the multi-step adversarial training, two diagnostic experiments on CIFAR10 were first performed. The first experiment is to test a seemingly correct assumption: using stronger adversarial attacks during training will lead to more robust models. To this end, two adversarially trained models, differed only in the hyper-parameters of the inner maximization, were compared: 1) the first model, denoted by PGD7-2, has a number of iterations as 7 and the step size as 2 pixels; 2) the second model, trained using a weaker attack and denoted by PGD2-8, has a number of iteration as 2 and the step size as 8 pixels. It was observed that PGD2-8 was largely as robust as PGD7-2 under different white-box attacks, even though PGD2-8 attack was weaker than PGD7-2 attack. This result led to a hypothesis that robustness may not be achieved by simply fitting sufficient adversarial examples during training, and to reconsider if there are more essential ingredients that directly relate to network robustness. With this hypothesis, the second experiment was conducted where the gradient magnitude of both undefended models and adversarially trained models were compared. By visualizing the histogram, it was observed that the gradient magnitude of adversarially trained models was much smaller than that of the undefended models. Intuitively speaking, if the gradient (with respect to input images) becomes extremely small, the gradient-based adversarial attacks are likely to fail no matter how many iterations are used. This suggested that gradient magnitude may be a direct proxy linking to network robustness.

Based on the above observations, in order to achieve adversarial robustness, it is desirable to have a network to satisfy the following two conditions: 1) low loss (zero-order condition); 2) small gradient magnitude (first-order condition). To this end, in this patent document, embodiments of a formulation are disclosed to achieve these two conditions by perturbing both input images and labels during training, which may be referred to as Bilateral Adversarial Training (BAT). As for generating the adversarial image, one or more one-step PGD embodiments are adopted to speed up training by multiple times. In one or more embodiments, in order to avoid the troublesome label leaking and gradient masking problem often induced by one-step PGD, the following procedures were done: 1) using targeted attack with target label being the most confusing class; 2) adding random uniform noise to the original image as initialization, i.e., random start. As for generating adversarial labels, embodiments to perturb the ground-truth label (in the form of one-hot vector) based on the gradient with respect to input label (i.e., the negative logarithm probability) are disclosed. In a special case, the perturbation solution reduces to label smoothing when the gradients of non-ground-truth classes are equal.

In one or more experimental settings, it was first empirically demonstrated that random start and the MC targeted attack are very effective at avoiding label leaking and gradient masking problem. The model trained by using these two techniques alone may achieve similar robustness as multi-step adversarially trained models. Next, after adding adversarial label part, embodiments of the presented model significantly improve the state-of-the-art results. In order for rigorous robustness evaluation, strong white-box attacks such as PGD100 and PGD1000 with both cross-entropy loss and margin-based loss were used. For example, against PGD100 under cross-entropy loss, on CIFAR10, performance of embodiments of the presented model achieves 63.7% versus 47.2%. At last, in one or more experimental settings, embodiments of the presented method were applied to one or more very challenging datasets. Embodiments of the presented method were successfully trained using only 8 GPUs, compared with 53 GPUs used by some and 128 GPUs used by others. Compared with some recent state-of-the-art, embodiments of the presented method are better on clean images and against non-targeted attacks and using an order-of-magnitude less computational resources.

B. Some Related Work

1. Adversarial Attacks

Adversarial examples have long been studied in machine learning. In the time of modern deep learning, some first pointed out that CNNs are vulnerable to adversarial examples, and proposed a box-constrained L-BFGS method to compute them. Later on, some proposed the fast gradient sign method (FGSM) to efficiently generate adversarial examples. FGSM was then extended to an iterative version, which showed that adversarial examples can exist in the physical world. Some proposed DeepFool to compute the adversarial perturbations, and define and quantify the robustness of classifiers. Some proposed Carlini and Wagner (CW) attack to use margin-based loss, and apply change-of-variables to remove the constraint. In spite of being very slow, CW attack is currently one of the strongest attacks. Later some modified the loss function by applying elastic net regularization.

There are some works devoted to improving the transferability of adversarial examples, which leads to stronger black-box attacks. In white box attacks, the attacker has access to image model's parameters; while in black box attacks, the attacker has no access to these parameters. Some proposed to compute the adversarial perturbation by attacking an ensemble of networks simultaneously and demonstrated improved transferability. Some assumed a scenario where the attackers have access to the prediction results of a few examples, then trained a substitute/surrogate model based on the limited number of examples, and generated adversarial examples using the substitute model. Some demonstrated that momentum-based iterative attacks achieve better transferability. There are some works proposing zeroth-order attacks, i.e., using the logit to generate the attacks. Besides, some proposed the boundary attack, which is based on the final model decision, instead of the gradient or logit.

In addition to image classification, adversarial examples were also studied in many other tasks, including object detection, semantic segmentation, speech recognition, image captioning, deep reinforcement learning. Besides the additive perturbation model, some studied how to generate adversarial examples under rotation and translation. Some studied physically adversarial example in the context of detecting stop sign in real world. Another interesting topic is synthesized robust adversarial examples in 3D.

2. Adversarial Defenses

In recent years, many methods have been proposed to defend against adversarial examples. One line of research is on detecting adversarial examples. Some showed that their CW attack is able to bypass most detection methods. Another line of research tries to break the special structure in adversarial perturbation by random or non-differentiable operations. Recently, some showed that many existing defense methods relied on gradient masking, which leads to a false sense of robustness against adversarial attacks, and then developed attacks to break most defense methods being studied. There are also some works demonstrating that gradient-based regularization improves robustness.

Adversarial training is currently the best defense method against adversarial attacks. Some scaled up adversarial training to challenging dataset, where one-step least likely targeted attack was used to generate adversarial examples during training. Some pointed out that such adversarially trained models suffer from gradient masking, and proposed ensemble adversarial training, which augmented the training data with perturbations computed from a set of held-out models. Some demonstrated that multi-step adversarial training was very effective at achieving robustness, and also managed to avoid the gradient masking problem.

C. Motivation for Bilateral Adversarial Training

In this section of the present patent document, two aspects of the multi-step adversarial training method are empirically analyzed: 1) if more iterations in the inner maximization improves the robustness, and 2) the gradient magnitude of both undefended models and adversarially trained models. The experiments are conducted on CIFAR10. Based on the analyses, it was hypothesized that making the loss surface locally flat (i.e., small local gradient magnitude) helps achieve better robustness. Embodiments of disclosed training methods are given in section D.

1. Background

In this section, a short description of a prior art adversarial training method is first given. This method was viewed as currently achieving the best adversarial robustness. Specifically, it solves the following saddle point (minimax) problem.

$$\min_{\theta} \{\mathbb{E}_{(x,y) \sim \mathcal{D}} [\max_{x' \in S_x} L(x', y; \theta)]\}. \quad (1)$$

Here (x, y) denotes the original data point, x' denotes the adversarially perturbed image, $L(\cdot)$ denotes the loss function, and $\epsilon_x$ denotes the perturbation budget. The feasible region $S_x$ is defined as (with all images rescaled with pixel values in [−1,1]):

$$S_x = \{z | z \in B(x, \epsilon_x) \cap [-1.0, 1.0]^n\} \quad (2)$$

where $B(x, \epsilon_x) \triangleq \{z | \|z-x\|_\infty \le \epsilon_x\}$ denotes the $\ell_\infty$-ball with center x and radius $\epsilon_x$. In the following, for the sake of notational simplicity, without loss of generality, the formulation is presented based on a single sample. The outer minimization is minimizing the cross-entropy loss as in the standard classification. The inner maximization corresponds to the adversarial attack. In order to better explore the solution in $B(x, \epsilon_x)$, some uses random start before taking a number of PGD steps, i.e.:

$$x^0 \sim B(x, \epsilon_x), \quad (3)$$

$$x^{t+1} = \Pi_{S_x}(x^t + \epsilon_x \cdot \text{sign}(\nabla_x L(x^t, y; \theta))) \quad (4)$$

The original image x is at first randomly (uniform) perturbed to some point $x^0$ in $B(x, \epsilon_x)$ as in equation (3), and then goes through several PGD steps as in equation (4). The $\Pi_{S_x}(\cdot)$ operator projects the input into the feasible region $S_x$.

2. Analyses

Do More Iterations Help?

In one or more embodiments, the question regarding whether more iterations in inner maximization help improve the robustness was first examined. To this end, two adversarially trained models with different hyper-parameters for generating the adversarial examples during training were compared. The first mode, denoted by PGD7-2, used 7 steps of PGD, and step size is 2.0. The second model was a seemingly weaker variant, denoted by PGD2-8, meaning only 2 steps of PGD are used and step size is 8.0. The perturbation budget is 8.0 in training and evaluation, and random start is used. From Table 1, it may be seen that PGD2-8 performs roughly the same as PGD7-2, against PGD attacks with different steps (strength). This result led to a hypothesis that using stronger attacks during training may not necessarily lead to more robust models.

TABLE 1

Comparison between a model PGD7-2 and an adversarially trained model PGD2-8 using a weaker attack during training. Both models achieve similar robustness

| Acc. (%) | clean | FGSM | PGD2-8 | PGD7-2 | PGD20-2 | PGD100-2 |
|---|---|---|---|---|---|---|
| PGD7-2 | 88.0 | 57.0 | 53.0 | 51.2 | 47.6 | 47.2 |
| PGD2-8 | 88.2 | 56.9 | 53.2 | 50.5 | 46.7 | 46.2 |

Gradient Magnitude of Adversarially Trained Models.

Next the gradient magnitude of the undefended models and adversarially trained models were examined. In one or more experimental settings, three collections of all test images in CIFAR10 were considered, and for each collection the minimal, average, and maximal i.e., of gradient magnitude $\|\nabla_x L(x, y; \theta)\|_2^2$ were computed. The three collections are: 1) entire images, denoted by "all", 2) correctly predicted images, denoted by "correct", 3) wrongly predicted images, denoted by "wrong". The numbers are shown in Table 2. It can be seen that for any collection, the gradient magnitude of undefended model is much larger than that of adversarially trained model. Also, for each model, the gradient magnitude of correctly predicted images is much smaller than that of wrongly predicted images.

TABLE 2

The minimal, average, and maximal value of gradient magnitude of the test images on CIFAR10. Overall Adversarially trained models have much smaller gradient magnitude than undefended models.

| | undefended | | adversarially trained | |
|---|---|---|---|---|
| Acc. (%) | all | correct | all | correct |
| min | 3.0e−32 | 3.0e−32 | 264.1 | 2.6e−26 | 2.6e−26 | 0.2 |
| mean | 395.0 | 23.6 | 7.4e3 | 3.8 | 0.4 | 28.9 |
| max | 4.5e4 | 7.0e3 | 4.5e4 | 236.2 | 85.9 | 236.2 |

3. Hypothesis

From the above analyses, it is hypothesized that small gradient magnitude directly links to the adversarial robustness. Intuitively speaking, if the loss surface is locally "flat" around the data points, the model is hard to attack, no matter how many steps are used. Some studied possible relationship between the flatness of loss surface and the generalization of the model. In the present patent document, gradient magnitude is simply used to measure the "flatness." A rigorous treatment may be used based on disclosure of the present patent document.

A straightforward idea to reduce the gradient magnitude is to augment the loss function with some form of gradient regularization during training. However, the key problem of this idea is that training requires the computation of second-order derivatives, which becomes extremely slow and expensive for large-scale networks.

D. Adversarially Training Embodiments

In this section, in order to improve the adversarial robustness, embodiments of Bilateral Adversarial Training (BAT), which simultaneously perturbs both the image and the label during adversarial training, are disclosed.

Figure 2:
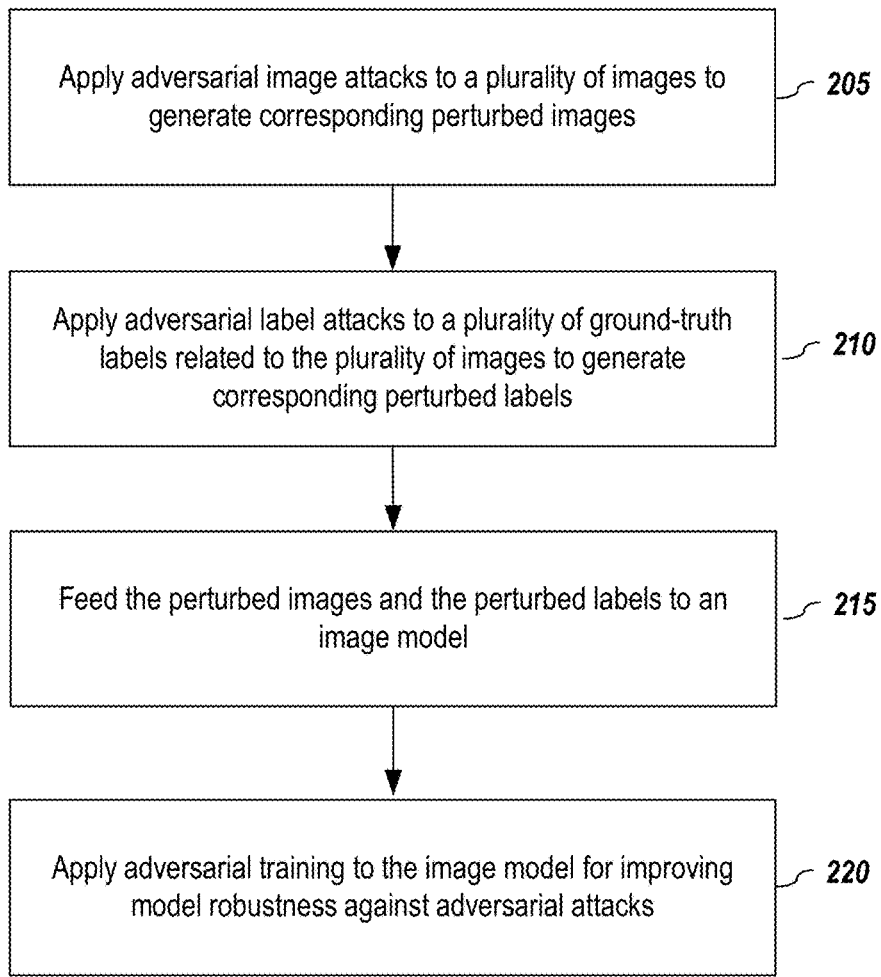
FIG. 2 depicts a methodology for bilateral adversarial training, according to embodiments of the present disclosure.

FIG. 1 and FIG. 2 respectively depict system architecture and a methodology for Bilateral Adversarial Training (BAT), according to embodiments of the present disclosure. The system comprises a training dataset 105 having a plurality of images 110 with associated ground-truth labels 115, an adversarial image module 120, an adversarial label module 130, and an image model 145. The adversarial image module 120 applies (205) adversarial image attacks to the plurality of images 110 to generate corresponding adversarial images or perturbed images 125. In one or more embodiments, a single-step PGD with random start is used in adversarial image attacks for generating the perturbed images. The adversarial label module 130 applies (210) adversarial label attacks to the plurality of ground-truth labels 115 to generate corresponding adversarial labels or perturbed labels 135. In one or more embodiments, each ground-truth label is represented as a one-hot vector comprising a probability distribution in a probability simplex among a plurality of classes (including a ground-truth class) and the perturbed label is a one-hot vector in a perturbed probability distribution in the probability simplex. A probability simplex may be defined as a subset of the unit simplex in which each element in the vector is non-negative and the sum of the elements of the vector is one. A one-hot vector may be defined as a vector with only one element as "1" and all other elements as "0". The perturbed images 125 and the perturbed labels 135 are then fed (215) to the image model 140. Adversarial training is then applied (220) to the image model for improving model robustness against adversarial attacks.

In one or more embodiments, the generation of the perturbed images 125 and the perturbed labels 135 are correlated or independent from each other. The adversarial image attacks and adversarial label attacks may be targeted attacks or non-targeted attacks. Some detailed embodiments for generating adversarial images or labels are discloses in the following subsections. In targeted attacks, minimal modifications are made to input images or labels such that they will be misclassified by image models as another specific targeted class. In non-targeted attacks, modifications are made to the input images or labels without specific class intended for the model to misclassify the perturbed input to any class/output different from the actual class.

Although FIG. 1 and the embodiments in this section show generating adversarial images, one skilled in the art shall understand that the adversarial labels may be applied for deep learning neural network model training in other applications, including but not limited to speech recognition, etc. Therefore, the adversarial image module 120 and the image model 140 shown in FIG. 1 may be replaced by a general adversarial object module (e.g., an adversarial voice module or an adversarial image module) and a general object recognition model (e.g., a speech recognition model or an image classification model) respectively. The training dataset may comprise a plurality of elements (e.g., images or other elements). By doing so, one or more embodiments disclosed in the presented patent document may be applicable for BAT training in other areas, such as improving the speech recognition model robustness against adversarial attacks.

In one or more embodiments, the general adversarial training is first analytically related to small gradient magnitude. Let x, x' denote the original and the slightly perturbed image, and y, y' denote the original and the slightly perturbed ground-truth (in the form of a probability distribution lying in the probability simplex). Let $L(\cdot)$ denote the loss function. The first-order Taylor expansion of the loss may be represented as:

$$L(x',y';\theta) \approx L(x,y;\theta) + \nabla_x L(x,y;\theta) \cdot (x'-x) + \nabla_y L(x,y;\theta) \cdot (y'-y) \quad (5)$$

Here, the perturbation budget constraint in $\ell_\infty$-norm is used.

$$\|x'-x\|_\infty \leq \epsilon_x, \|y'-y\|_\infty \leq \epsilon_y \quad (6)$$

By Holder's inequality, from equation (5), the upper bound may be approximately described as:

$$L(x',y';\theta) \leq L(x,y;\theta) + \epsilon_x \|\nabla_x L(x,y;\theta)\|_1 + \epsilon_y \|\nabla_y L(x,y;\theta)\|_1 \quad (7)$$

It is noted that the bound in equation (7) becomes tight when x' and y' are adversarially computed based on the gradient, especially when they are generated by one-step PGD.

Intuitively speaking, adversarial training, by minimizing $L(x',y';\theta)$, translates to 1) minimizing $L(x,y;\theta)$ and 2) minimizing the gradient magnitude $\|\nabla_x L(x,y;\theta)\|_1$ and $|\nabla_y| \|\nabla_y L(x,y;\theta)\|_1$. The second part explains the results in Table 2. It is noted that the first part makes the network predict the correct class, and the second part makes it difficult because the gradient magnitude becomes very small.

The above formulation does not specify how to generate x',y'. In one or more embodiments, the optimization problem may be written as:

$$\max_{x' \in S_x, y' \in S_y} L(x', y'; \theta) \quad (8)$$

Here $S_x$ is defined by equation (2), and $S_y$ may be defined as:

$$S_y = \{z | z \in B(y, \epsilon_y), z \geq 0, \Sigma_i z_i = 1\}. \quad (9)$$

The final formulation for adversarial training may be written as follows:

$$\min_\theta \left[ \max_{x' \in S_x, y' \in S_y} L(x', y'; \theta) \right] \quad (10)$$

where $(x, y) \sim \mathcal{D}$. In one or more embodiments, the strategy to solve equation (10) is to decompose it into two separate sub-problems and optimize over x' or y' conditioned on the other respectively. After obtaining x', y', they are used in place of the original x, y as the training data points and optimized over θ. In other words, the training batch only contains adversarially perturbed images. In the following two subsections, solutions to each sub-problem are described respectively.

1. Embodiments of Generating Adversarial Labels

This subsection studies how to generate the adversarial label y' given the original data point x,y. One may then solve the following:

$$\max_{y' \in S_y} L(x, y'; \theta) \quad (11)$$

Here the original ground-truth y is a one-hot vector, i.e., $y_c=1$ and $y_k=0$, $k \neq c$. k denotes the class index and c denotes the ground-truth class. In one or more embodiments, one-step PGD is used to solve equation (11).

$$y' = \Pi_{S_y}(y + \alpha \nabla_y L(x,y;\theta)). \quad (12)$$

$$\nabla_{y_k} L(x,y;\theta) = -\log(p_k) \quad (13)$$

Here the $\Pi_{S_y}(\cdot)$ operator projects the input into the feasible region $S_y$. Basically, it ensures that the adversarial label y' is in $B(y, \epsilon_y)$ and also in the probability simplex. In one or more embodiments, a heuristic solution is used to achieve both. Some short notations are used in the following:

$$v_k = \nabla_{y_k} L(x, y; \theta), \; v_{MC} = \min_{k \neq c} v_k, \; v_{LL} = \max_{k \neq c} v_k. \quad (14)$$

Here "MC" (most confusing) corresponds to the non-ground-truth class with the highest probability or the minimum gradient of loss $\nabla_{y_k} L(x,y;\theta)$, and "LL" (least likely) corresponds to the non-ground-truth class with the lowest probability.

Figure 3:
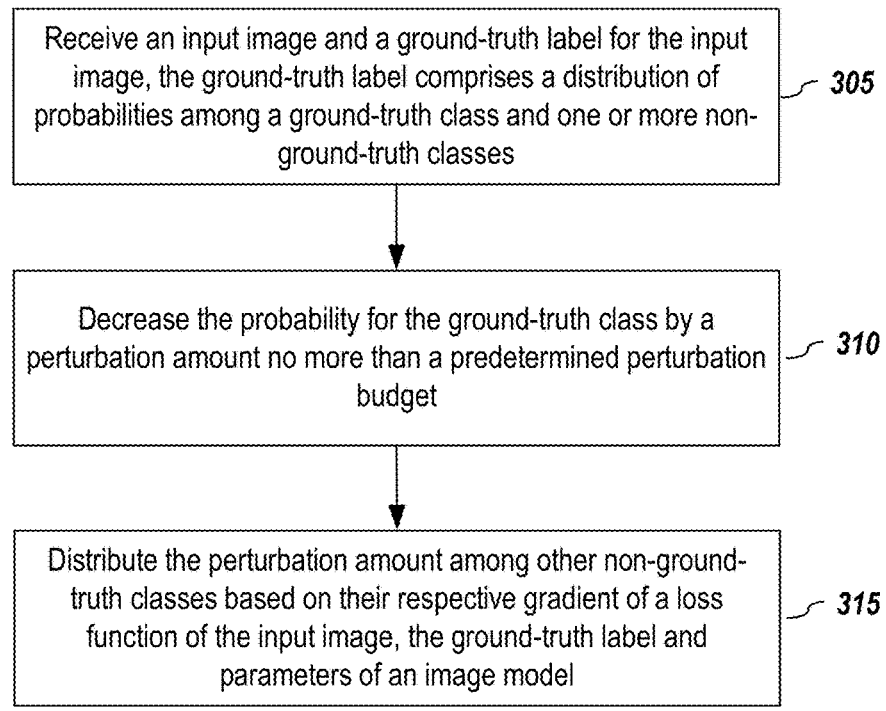
FIG. 3 depicts a methodology of generating adversarial labels for adversarial training, according to embodiments of the present disclosure.

FIG. 3 depicts a methodology of generating adversarial labels for adversarial training, according to embodiments of the present disclosure. An original input image and a ground-truth label for the input image are received (305). In one or more embodiments, the ground-truth label y comprises a distribution of probabilities $y_k$ in a probability simplex among a ground-truth class and one or more non-ground-truth classes. In one or more embodiments, the distribution of probabilities is a one-hot vector, e.g., $y_c=1$ and $y_k=0, k \neq c$. k denotes the class index and c denotes the ground-truth class. The probability for the ground-truth class $y_c$ is decreased (310) by a perturbation amount no more than a predetermined perturbation budget $\epsilon_y$ (such as from 1 to $1-\epsilon_y$). The decreased perturbation amount is distributed (315) among other non-ground-truth classes. In one or more embodiments, the share for each non-ground-truth class is based on its respective gradient $v_k = \nabla_{y_k} L(x,y;\theta)$. In one or more embodiments, the share for the MC class (i.e., $y'_{MC}$) is set to be very small as a minimal value (e.g., much smaller or smaller by at least an order of magnitude compared to the predetermined perturbation budget $\epsilon_y$). In other words, $\epsilon_y$ is distributed among non-ground-truth classes while keeping the share of the MC class very small. Specifically, the share for each non-ground-truth class other than the MC class is proportional to the gradient of each class subtracted by the minimal gradient (which corresponds to the MC class). This way, the following equation may be obtained:

$$y'_k = \frac{\epsilon_y}{n-1} \cdot \frac{v_k - v_{MC} + \gamma}{\frac{\sum_{k \neq c} v_k}{n-1} - v_{MC} + \gamma}, \; k \neq c \quad (15)$$

Here γ is a very small value. Subsection 2 in Section D discloses another heuristic solution embodiment. It may be seen that if the gradient of non-ground-truth classes are equal, the second multiplicative term becomes 1 and the following equation may be obtained:

$$y'_k = \frac{\epsilon_y}{n-1}, \; k \neq c \quad (16)$$

This is exactly the label smoothing. In other words, label smoothing may be viewed as an adversarial perturbation of the ground-truth label.

It shall be noted that $\epsilon_y$ controls the perturbation budget of y. In one or more embodiments, it is desirable to find the largest $\epsilon_y$ that leads to the most adversarially perturbed label. In one or more embodiments, the probability of the ground-truth class (i.e., $y'_c$) is kept at least β times larger than the maximal probability over non-ground-truth classes (i.e., $y'_{LL}$). Mathematically, it may be expressed as:

$$y'_c \geq \beta \cdot \max_{k \neq c} y'_k \quad (17)$$

Solving the following equation:

$$1 - \epsilon_y \geq \frac{\beta \epsilon_y}{n-1} \cdot \frac{v_{LL} - v_{MC} + \gamma}{\frac{\sum_{k \neq c} v_k}{n-1} - v_{MC} + \gamma} \quad (18)$$

Equation (19) may be obtained as:

$$\epsilon_y \leq \frac{1}{1 + \frac{\beta}{n-1} \cdot \frac{v_{LL} - v_{MC} + \gamma}{\frac{\sum_{k \neq c} v_k}{n-1} - v_{MC} + \gamma}} \quad (19)$$

In the following are two extreme embodiments:

1) The probabilities of non-ground-truth classes are evenly distributed, i.e., label smoothing. In this case, $v_{LL}=v_{MC}$. Equation (20) may be obtained as:

$$\epsilon_y = \frac{1}{1 + \frac{\beta}{n-1}} \quad (20)$$

Take CIFAR10 for example (n=10), in one or more embodiments, $\epsilon_y=0.1$, β=8, or $\epsilon_y=0.5$, β=9, or $\epsilon_y=0.9$, β=1, are used.

2) The probabilities of non-ground-truth classes are centered on one class. In this case, $v_{LL}=\Sigma_{k \neq c} v_k$, $v_{MC}=0$. Then Equation (21) may be obtained as:

$$\epsilon_y = \frac{1}{1 + \beta \cdot \frac{v_{LL} + \gamma}{v_{LL} + (n-1)\gamma}} \approx \frac{1}{1+\beta} \quad (21)$$

Here γ is usually very small, e.g., γ=0.01.

In one or more embodiments, given the multiplier β, the range of perturbation budget $\epsilon_y$ may be expressed as:

$$\epsilon_y \in \left(\frac{1}{1+\beta}, \frac{1}{1+\frac{\beta}{n-1}}\right) \qquad (22)$$

In one or more embodiments, it is only needed to specify a proper β. As a special case, β=∞ corresponds to the original one-hot label.

2. Alternative Embodiments of Generating Adversarial Labels

In this subsection, alternative embodiments of generating adversarial labels using heuristic solution are disclosed.

$$\max_{\|y'-y\|_\infty \le \epsilon_y} L(x, y'; \theta). \qquad (23)$$

Here the original ground-truth y is a one-hot vector, i.e., $y_c=1$ and $y_k=0$, $k \ne c$.

In previous subsection, the heuristic is to distribute the $\epsilon_y$ to non-ground-truth classes while keeping the share of the MC class very small. Specifically, the share is proportional to the gradient of each class subtracted by the minimal gradient (which corresponds to the MC class). In one or more embodiments, this subsection discloses another simpler heuristic solution, in which the share is directly proportional to the respective gradient. The formula may be easily obtained:

$$y'_k = \frac{\epsilon_y v_k}{\sum_{k \ne c} v_k}, k \ne c. \qquad (24)$$

Wherein $v_k$ is used to denote $\nabla_{y_k} L(x,y;\theta)$ for short. By using the following condition $$y_c \ge \beta \max_{k \ne c} y'_k, \qquad (25)$$

the largest budget $\epsilon_y$ may be solved as:

$$\epsilon_y \le \frac{1}{1+\frac{\beta v_{max}}{\sum_{k \ne c} v_k}}. \qquad (26)$$

In one or more embodiments, this solution is an exact application of gradient ascent:

$$y'_k = y_k + \alpha \nabla_{y_k} L(x, y; \theta), k \ne c, \qquad (27)$$

where $$\alpha = \frac{1}{\sum_{k \ne c} v_k + \beta v_{max}}. \qquad (28)$$

In one or more embodiments, the solution used in subsection D.1 is preferred over equation (24) in this subsection for two reasons. Firstly, from the optimization point of view, the solution in subsection D.1 leads to a higher (better) objective value for the maximization problem in equation (23), because it distributes more shares to the classes with larger gradient. Secondly, the solution in subsection D.1 leads to a smaller $y'_{MC}$ (proof is given at the end of this subsection). It shall be noted that the adversarial image used in training is generated by MC targeted attack. Using a smaller $y'_{MC}$ may suppress the network to predict large probability on the MC class, thus better focusing on predicting large probability on the ground-truth class. The results achieved by these two solutions are shown in Table 3, where "main" refers to using the solution in subsection D.1, and "sup" refers to using the equation (24) in this subsection D.2. It can be seen that "main" is slightly better than "sup" against multi-step PGD attacks.

TABLE 3

The classification accuracy of the proposed R-MC-LA models under various white-box attacks on CIFAR10. The source models are trained using two solutions for generating the adversarial labels. β = 9 and $\epsilon_y$ = 8 were used during training and in evaluation.

| Acc.(%) | clean | FGSM | CE20 | CE100 | CW100 |
| --- | --- | --- | --- | --- | --- |
| R-MC-LA (main) | 90.8 | 69.3 | 54.6 | 52.9 | 51.9 |
| R-MC-LA + (main) | 91.0 | 70.3 | 57.5 | 55.2 | 53.8 |
| R-MC-LA9 (sup) | 90.2 | 70.9 | 53.2 | 51.1 | 49.9 |
| R-MC-LA9 + (sup) | 91.5 | 71.4 | 57.2 | 54.1 | 51.5 |

Lastly, proof is provided to support that the solution in subsection D.1 leads to a smaller $y'_{MC}$. From the solution in subsection D.1, the following equation is obtained:

$$y'_{MC,main} = \frac{\gamma}{\sum_{k \ne c} v_k - (n-1)(v_{MC} - \gamma) + \beta(v_{LL} - v_{MC} + \gamma)}. \qquad (29)$$

From the equation (24), the following equation may be obtained:

$$y'_{MC,sup} = \frac{v_{MC}}{\sum_{k \ne c} v_k + \beta v_{LL}}. \qquad (30)$$

In one or more embodiments, the sufficient and necessary condition of $$y'_{MC,main} < y'_{MC,sup} \qquad (31)$$

may be expressed as:

$$(n-1)v_{MC} + \beta v_{MC} < \Sigma v_k + \beta v_{LL}, \qquad (32)$$

which is obviously true. This is because the left is smaller than the right on both the first term and the second term respectively.

3. Embodiments of Generating Adversarial Images

In this subsection, embodiments of obtaining adversarial image x' given the original data point x, y are disclosed. Mathematically, the following problem needs to be solved:

$$\max_{x' \in S_x} L(x', y; \theta) \qquad (33)$$

This is the adversarial attack problem. For non-targeted attacks, maximization may be applied directly. The downside of using non-targeted attacks is label leaking, a phenomenon that during adversarial training, there is extra information about label being leaked, thus making the problem simple instead of increasing the difficulty for model to success. This is because during training, the model implicitly learns to infer the true label from the adversarial perturbation (gradient). In other words, the model smartly finds a shortcut towards the local optima. A more general and severe problem is gradient masking, which refers to the fact that the loss surface of the model is very jagged, and so it becomes harder for the attackers to find good gradient during the iterative attack. Gradient masking (a.k.a. gradient obfuscation) may give a false sense of robustness, and the model may get broken in the face of strong attacks with large number of iterations.

Recently, two techniques were proposed to reduce or avoid gradient masking problem: 1) using multi-step PGD; 2) using an ensemble of models to generate adversarial examples. However, the effectiveness comes with expensive time cost or memory cost. Since one of considerations in this patent disclosure is speed, the focus in one or more embodiments is on two techniques: 1) using targeted attack; and 2) adding random noise as in Equation (3).

As for targeted attack, the Least Likely (LL) class has been used as the targeted class, i.e., $$y'=\mathrm{argmax}_{\hat{y} \neq y} L(x, \hat{y}; \theta). \quad (34)$$

Differently, here in one or more embodiments of this patent document, the Most Confusing (MC) class is used as the targeted class, i.e., $$y'=\mathrm{argmin}_{\hat{y} \neq y} L(x, \hat{y}; \theta). \quad (35)$$

Figure 4:
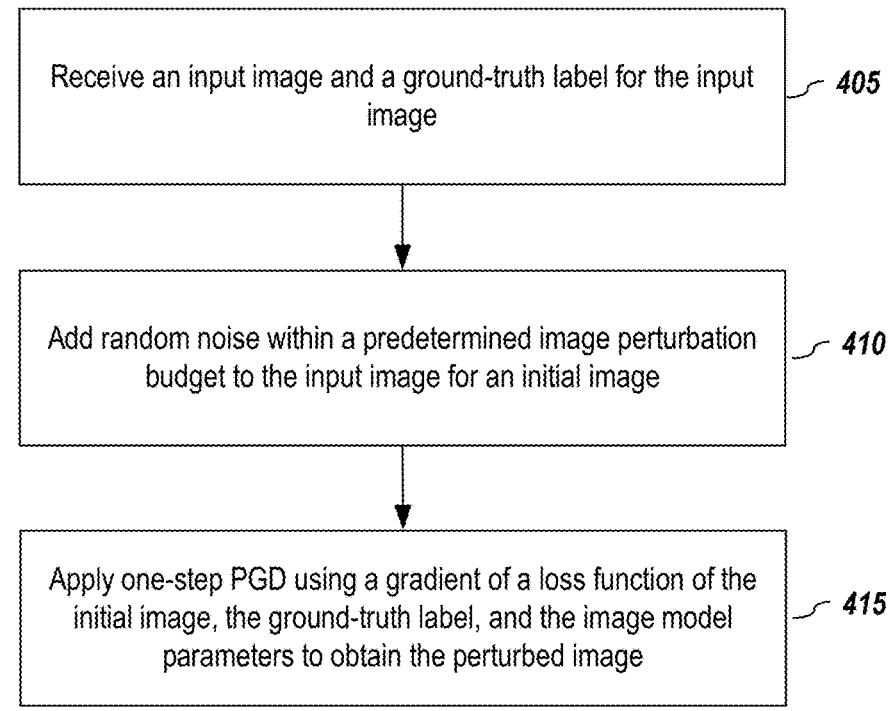
FIG. 4 depicts a methodology of generating adversarial images for adversarial training, according to embodiments of the present disclosure.

FIG. 4 depicts a methodology of generating adversarial images for adversarial training, according to embodiments of the present disclosure. An original input image x and a ground-truth label y for the input image are received (405). In one or more embodiments, the ground-truth label y is a one-hot vector comprising a distribution of probabilities $y_k$ in a probability simplex among a ground-truth class and one or more non-ground-truth classes, i.e., $y_c=1$ and $y_k=0$, $k \neq c$, c is the ground-truth class. Random noise within a predetermined image perturbation budget $\epsilon_x$ is added (410) to the input image as an initial image $x^0$. In one or more embodiments, for fast training, a one-step PGD is applied (415), using a projection operator to project a combination of the initial image $x^0$ and a gradient $\nabla_x$ of a loss function $L(x^0, y; \theta)$ of the initial image $x^0$, the ground-truth label y, and the image model parameters θ into a feasible region to obtain the perturbed image x'. In embodiments on one or more difficult database having large numbers of classes, two-step PGD may be used instead of one-step PGD. It shall be noted that the equations (3) and (4) are for non-targeted attacks in one or more embodiments of the present patent document.

Figure 5:
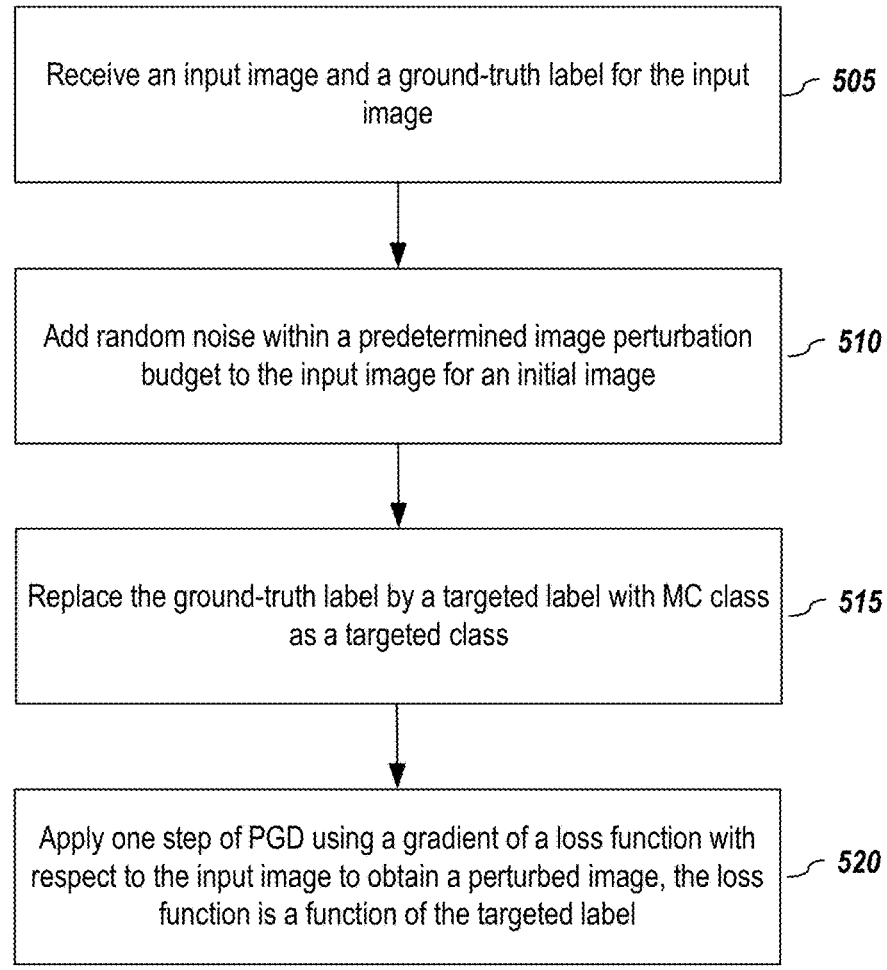
FIG. 5 depicts a methodology of generating targeted adversarial attacks for adversarial training, according to embodiments of the present disclosure.

FIG. 5 depicts a methodology of using targeted attacks for adversarial training, according to embodiments of the present disclosure. An original input image x and a ground-truth label y for the input image are received (505). In one or more embodiments, the ground-truth label y is a one-hot vector comprising a distribution of probabilities $y_k$ in a probability simplex among a ground-truth class and one or more non-ground-truth classes, i.e., $y_c=1$ and $y_k=0$, $k \neq c$, c is the ground-truth class. Random noise within a predetermined image perturbation budget $\epsilon_x$ is added (510) to the input image as an initial image $x^0$. For targeted attacks, the ground-truth label y ($y_c=1$ and $y_k=0$, $k \neq c$, c is the ground-truth class) is simply replaced (515) by a targeted label y' ($y_{MC}=1$ and $y_k=0$, $k \neq MC$, MC is the most confusing class) with the MC class as the targeted class. In next step, one-step PDG ($x^1 = \Pi_{S_x}(x^0 - \epsilon_x \cdot \mathrm{sign}(\nabla_x L(x^0, y'; \theta)))$) is applied (520) to generate a perturbed image $x^1$. It shall be noted that the plus sign in equation (4) is changed to minus sign here and loss function $L(x^0, y'; \theta)$ is a function of the targeted label y' instead of the ground-truth label y, in order to minimize the loss with respect to the targeted label.

E. Experiments

It shall be noted that these experiments and results are provided by way of illustration and were performed under specific conditions using a specific embodiment or embodiments; accordingly, neither these experiments nor their results shall be used to limit the scope of the disclosure of the current patent document.

Dataset and Network:

In one or more experimental settings, CIFAR10 (A. Krizhevsky, Learning multiple layers of features from tiny images, Technical report, 2009), and one or more large-scale challenging datasets were used. MNIST was not used because it is not a good testbed due to the near-binary nature of the images. For CIFAR10, wide residual networks (Wide ResNet) WRN-28-10 were used. For challenging datasets, ResNet family was used. Most of the diagnostic experiments are conducted on CIFAR10, because it is currently the most commonly used dataset for adversarial training.

Evaluation:

Based on the amount of knowledge that attackers have, there are several types of attacks: i) Gradient-based (white-box), where the attackers have full knowledge of the model (structure, parameters); ii) Score(logit)-based, where the attackers know the score/logit vector of the model; iii) Decision-based, where the attackers only know the predicted class (e.g., boundary attack). It shall be noted that the more information the attackers have, the stronger the adversarial attacks will be. In one or more experimental settings, the strongest gradient-based white-box attacks were used.

TABLE 4

The classification accuracy of one-step adversarially trained models, using different attacks, and, with or without random start. The models trained using random start are prefixed with "R-". It can be seen that random start and MC targeted attack are effective at preventing label leaking and gradient masking problem.

| Acc.(%) | clean | FGSM w.o. RS | FGSM RS | CE7 w.o. RS | CE7 RS | black |
|---|---|---|---|---|---|---|
| FGSM | 55.2 | 99.1 | 68.6 | 0.0 | 0.0 | 56.2 |
| R-FGSM | 89.8 | 55.8 | 63.6 | 46.4 | 48.0 | 88.0 |
| LL | 92.6 | 97.9 | 86.2 | 0.0 | 0.0 | 80.9 |
| R-LL | 91.4 | 46.6 | 56.6 | 34.1 | 36.0 | 88.2 |
| MC | 86.4 | 70.7 | 73.0 | 37.6 | 40.3 | 84.3 |
| R-MC | 89.9 | 62.6 | 70.2 | 46.8 | 48.4 | 87.1 |

For CIFAR10, evaluation setup was followed in order to generate strong attacks to evaluate the model robustness, 1) always use non-targeted attack, and 2) drop random start for one-step PGD attack (i.e. FGSM), and use random start for multi-step PGD attack. Also, for one-step attack, the step size is the perturbation budget (i.e., 8 pixels), and for multi-step attack, the step size is 2 pixels. Specifically, the perturbation budget is 8 pixels.

For challenging datasets, evaluation setup was followed using both the non-targeted attack, and the targeted attack where the target label is randomly selected. The step size is 1 pixel, expect for PGD10 attack where the step size is 1.6 pixel. Specifically, the perturbation budget is 16 pixels.

Implementation Details:

In one or more experimental settings, the learning rate schedule was [0.1, 0.01, 0.001] for CIFAR. For the short training, the decay epoch schedule was [60, 90, 100]. For the long training, the epoch schedule was [100, 150, 200]. In all the tables in this section, the models of long training were postfixed by "+". For challenging datasets, Tensorpack package was used and distributed adversarial training was performed with 8 GPUs. In one or more experimental settings, the learning rate schedule was [0.1, 0.01, 0.001, 0.0001], and the decay epoch schedule was [30, 60, 90, 100]. For ResNet50, the training took about 2 days on a DGX machine.

1. Random Start and MC Targeted Attacks

In this subsection, it was demonstrated that for one-step adversarial training, random start and MC targeted attack are effective at preventing label leaking and gradient masking problem. In one or more experimental settings, the diagnostic experiment was conducted on CIFAR10. To this end, three different ways of generating adversarial examples were evaluated during training: FGSM attack, LL targeted attack, and MC targeted attack. For each option, one-step adversarial training was performed with or without random start. This led to six adversarially trained models in total. In one or more experimental settings, the perturbation budget was 8 pixels in training. The results are shown in Table 4. The rows correspond to different models, where the prefix "R" means that random start is used. The columns correspond to non-targeted attacks using one-step (FGSM) or 7-step (CE7, CE is short for Cross-Entropy), with or without random start (denoted by "RS"). The last column corresponds to the black-box attack using the undefended model and FGSM attack (w.o. RS). Firstly, it was observed that the target models trained by FGSM and LL suffered badly from the label leaking problem because the accuracy against FGSM attack was even higher than the clean accuracy. However, this higher accuracy was just false robustness and the accuracy dropped to zero under CE7 attacks. Next, after applying random start, R-FGSM and R-LL became quite robust, demonstrating random start helps the model avoid the label leaking problem during adversarial training. Lastly, it was observed that the model R-MC performed the best, while R-LL performed the worst, against FGSM and CE7 attacks.

It was hypothesized that the adversarially trained mode by one-step LL targeted attack was weak, because the LL targeted attack was weak by itself. Table 5 shows the strength of these three attacks using one-step PGD. The rows correspond to different models trained using random start. The columns correspond to three attacks with or without random start. It was observed that MC targeted attack was roughly as strong as FGSM attack, and both of them were much stronger than LL targeted attack. This is probably because it is usually hard to slightly manipulate an original image into a visually very different class. Therefore, in one or more embodiments, MC targeted attack is used during adversarial training because 1) it is much stronger that LL targeted attack; 2) FGSM attack has the risks of label leaking and gradient masking problem.

TABLE 5

The classification accuracy of three attacks, i.e., FGSM attack, LL targeted attack and MC targeted attack, with or without random start. The rows correspond to different adversarially trained models. It is observed that MC targeted attack has similar strength as FGSM attack, and both are much stronger than LL targeted attack.

| | FGSM | | MC | | LL | |
|---|---|---|---|---|---|---|
| Acc. (%) | w.o. RS | RS | w.o. RS | RS | w.o. RS | RS |
| R-FGSM | 55.8 | 63.6 | 55.4 | 63.6 | 75.5 | 79.8 |
| R-LL | 46.6 | 56.6 | 44.0 | 55.6 | 70.7 | 76.4 |
| R-MC | 62.6 | 70.2 | 63.9 | 71.3 | 80.1 | 83.8 |

Here, the role of random start is briefly summarized. In training, it effectively prevents the label leaking and gradient masking problem, but in attack, it weakens the strength for one-step PGD attack (shown in Table 5). As shown later, random start has very little effect for multi-step PGD attack, especially when the number of steps becomes large.

2. Some Experimental Results on CIFAR10 Dataset

This subsection discloses results against white-box attacks on CIFAR10 dataset. It has 10 classes, 50K training images (5K per class) and 10 K test images. As summarized above, to generate adversarial images, random start and MC targeted attack (the perturbation budget is 8 pixels) were used. In one or more experimental settings, to generate adversarial labels, equation (19) was used to compute the budget $\epsilon_y$, and equation (15) was used to compute the adversarially perturbed labels y'. The resulting model was denoted as R-MC-LA where LA stood for label adversary. Experiment was also done with label smoothing (LS for short), a special case of adversarial label, and denoted this model by R-MC-LS. The baseline was the multi-step adversarial training method by Madry et al. (Towards deep learning models resistant to adversarial attacks, In International Conference on Learning Representations, 2018). The original numbers were reported and denoted by Madry, and the numbers by reproduced model according to one or more embodiments of the present patent document were also reported and denoted by Madry*. The accuracy against various steps of PGD attacks was given in Table 6. It was observed that perturbing labels during training significantly improved the robustness over the baseline. Label smoothing (R-MC-LS) worked pretty well, and label adversary (R-MC-LA) was even better. Besides, label adversary was also applied to the multi-step adversarial training. It was observed that the resulting models, denoted by Madry-LA and Madry-LA+, significantly improved the original version, further verifying the effectiveness of label adversary. Interestingly, R-MC-LA(+) performed even better than Madry-LA(+). Lastly, it was observed that longer training was helpful to all models.

TABLE 6

The classification accuracy of R-MC-LA models and variants under various white-box attacks on CIFAR10.

| Acc. (%) | clean | FGSM | CE7 | CE20 |
|---|---|---|---|---|
| R-FGSM | 89.8 | 55.8 | 48 | 42.9 |
| R-FGSM-LS($\epsilon_y$ = 0.5) | 89.1 | 62.0 | 54.6 | 49.0 |
| R-MC | 89.9 | 62.6 | 48.4 | 43.4 |
| R-MC-LS($\epsilon_y$ = 0.5) | 91.1 | 70.6 | 59.2 | 53.3 |
| R-MC-LS + ($\epsilon_y$ = 0.5) | 91.8 | 71.4 | 62.7 | 55.9 |
| R-MC-LA ($\beta$ = 9) | 90.7 | 69.6 | 59.9 | 55.3 |
| R-MC-LA + ($\beta$ = 9) | 91.2 | 70.7 | 63.0 | 57.8 |
| Madry [33] | 87.3 | 56.1 | 50.0 | 45.8 |
| Madry* | 88.0 | 57.0 | 51.2 | 47.6 |
| Madry-LA | 86.8 | 63.4 | 57.8 | 53.2 |
| Madry-LA+ | 87.5 | 65.9 | 61.3 | 57.5 |

2.1 Different Perturbation Budgets During Training

Figure 6:
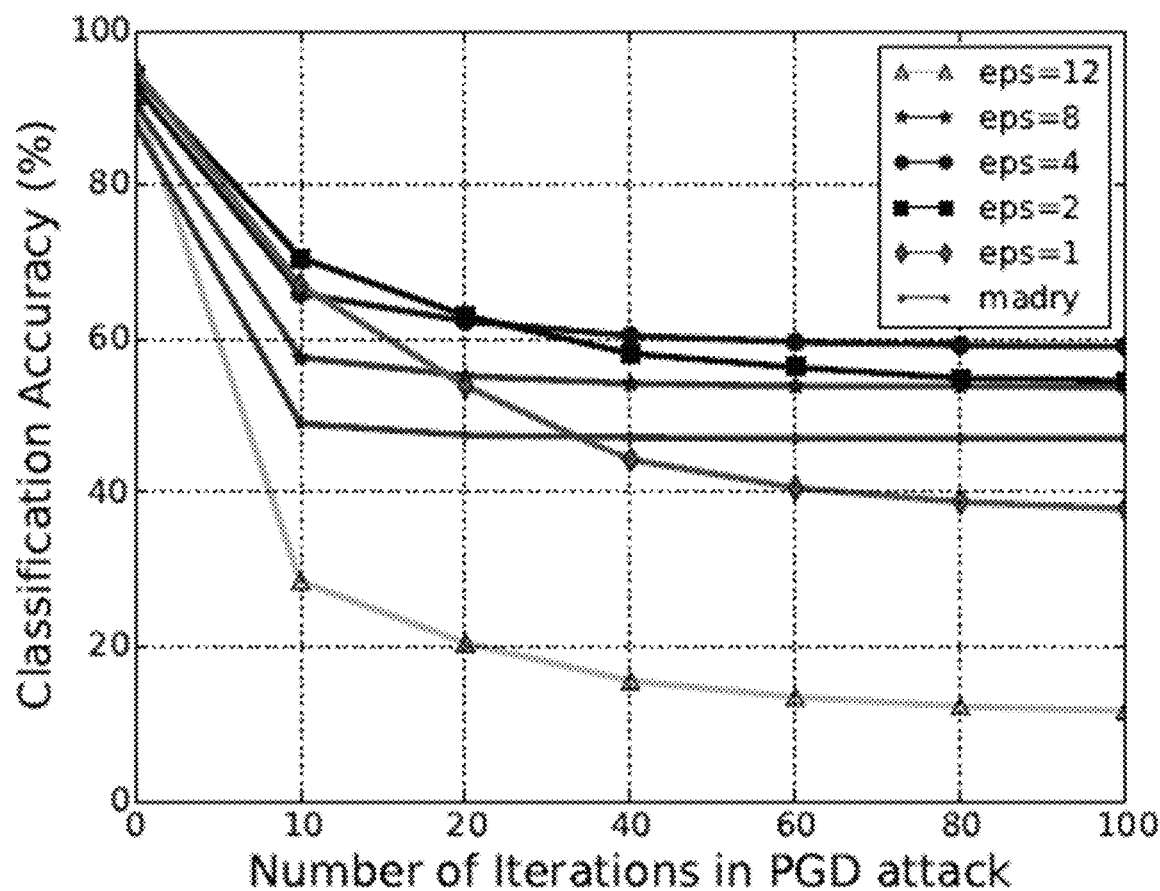
FIG. 6 graphically depicts model performance under different attack budgets for $loss_{cls}$ based PGD attacks, according to embodiments of the present disclosure.

This subsection discloses studies for whether using larger perturbation budget during training leads to more robust models. In one or more experimental settings, models were trained using different budgets $\epsilon_x \in \{1, 2, 4, 8, 12\}$ pixels during training, and 8 pixels was used for evaluation. FIG. 6 shows the classification accuracy with respect to the number of steps in white-box PGD attacks on CIFAR10. Firstly, a general trend was observed. As the number of steps increased, the accuracy dropped quickly and then plateaued. Secondly, it was observed that big budget (i.e., $\epsilon_x$=12) or small budget (i.e., $\epsilon_x=1$) led to less robust models. Interestingly, it was noticed that the model trained using $\epsilon_x=4$ achieved the best robustness. The exact numbers were given in Table 7. It shall be noted that to rule out randomness, the numbers were averaged over 3 independently trained models. The attacks were also tested using the margin-based CW loss. For example, CW200 attack means using CW loss and 200 steps PGD. It was noticed that 1) the baseline model performed similarly against either (cross-entropy-based) CE attack or (margin-based) CW attack; 2) CW attack was more effective than CE attack when attacking presented model embodiments (R-MC-LA). Furthermore, the best model, R-MC-LA+($\epsilon_x=4$) was evaluated against 1000-step PGD attacks using CE loss and CW loss. The accuracy was 61.4% for CE and 59.3% for CW, which was very close to that against 200-step PGD attack.

TABLE 7

The classification accuracy of the proposed R-MC-LA models under various white-box attacks on CIFAR10. To rule out randomness, the numbers are averaged over 3 independently trained models. $\beta = 9$ is used for experiments.

| Acc. (%) | clean | CE20 | CW20 | CE100 | CW100 | CW200 |
|---|---|---|---|---|---|---|
| R-MC-LA ($\epsilon_x = 8$) | 90.8 | 54.6 | 53.7 | 52.9 | 51.9 | 51.7 |
| R-MC-LA+ ($\epsilon_x = 8$) | 91.0 | 57.5 | 56.2 | 55.2 | 53.8 | 53.6 |
| R-MC-LA ($\epsilon_x = 4$) | 93.0 | 63.1 | 61.5 | 60.1 | 58 | 57.6 |
| R-MC-LA+ ($\epsilon_x = 4$) | 92.9 | 66.9 | 64.2 | 63.7 | 60.7 | 60.3 |
| R-MC-LA ($\epsilon_x = 2$) | 94.5 | 62.7 | 59.1 | 54.2 | 49.6 | 48.3 |
| R-MC-LA+ ($\epsilon_x = 2$) | 94.4 | 67.8 | 64.8 | 60.0 | 56.7 | 55.5 |
| Madry* | 88.0 | 47.6 | 48.6 | 47.2 | 48.1 | 48.1 |

TABLE 8

The classification accuracy against various white-box attacks on CIFAR10. $\epsilon_x = 4$ is used for experiments.

| Acc. (%) | clean | FGSM | CE1000 | MI | Ori-CW | DF-12 |
|---|---|---|---|---|---|---|
| R-MC-LA+ | 92.8 | 75.6 | 61.4 | 65.5 | 65.4/88.2 | 77.8 |
| TRADIES | 84.9 | 61.1 | 56.4 | 58.0 | 81.2 | 81.6 |

2.2 Against Other White-Box Attacks

Table 8 shows the accuracy against other white-box attacks. Various model embodiments were compared with the winner, TRADES (H. Zhang et al., Theoretically principled trade-off between robustness and accuracy, *arXiv preprint arXiv:*1901.08573, 2019) in NeurIPS18 Adversarial Vision Challenge. Default settings in the Cleverhands package were used to generate the attacks. "MI" refers to the MI-FGSM method (Y. Dong et al., Boosting adversarial attacks with momentum, 2018 *IEEE Conference on Computer Vision and Pattern Recognition*). "Ori-CW" refers to the original CW attack (N. Carlini et al., Towards evaluating the robustness of neural networks. 2017 *IEEE Symposium on Security and Privacy*), and the two numbers refers to two common sets of hyper-parameters: {const=100, confid=0, 1r=1e-1, max iter-1e2}/{const=100, confid=0, 1r=1e-2, max iter=1e3}. "DF-12" refers to the DeepFool attack with l2-norm (Seyed-Mohsen Moosavi-Dezfooli et al., DeepFool: a simple and accurate method to fool deep neural networks, 2016 *IEEE conference on Computer Vision and Pattern Recognition*). It was observed that presented model embodiments generally outperformed the baseline, except against the DeepFool attack. It shall be noted that presented network embodiment is smaller, and presented training method embodiments are an-order-of-magnitude faster, compared to H. Zhang, et al., (Theoretically principled trade-off between robustness and accuracy, *arXiv preprint arXiv:* 1901.08573, 2019), in which WRN-34, and 20-step PGD attack were used during training.

3. Various Datasets

One or more training datasets bedsides CIFAR, were used in various experimental settings. It was observed that presented model embodiments significantly outperformed the state-of-the-art results against clean images and PGD attacks of various strengths. Besides, a little different from CIFAR10, it was observed that embodiments of adversarially trained models achieve the best robustness when $\epsilon_x=2$ during training.

4. Some Challenging Datasets

In one or more experimental settings, one or more challenging datasets comprising multiple image and large numbers of classes were used for evaluation. There were very few papers applying multi-step adversarial training on challenging datasets having large numbers of classes, because it is very computationally expensive. Specifically, some used 53 P100 GPUs and some used 128 V100 GPUs. In one or more experimental settings, presented model embodiments were trained on a DGX machine with only 8 GPUs and it took about 2 days. For fair comparison, 16 pixels were used as perturbation budget. It was found that, using one-step attack during training (in this case step size is 16) suffered severely from label leaking and gradient masking. Similar problem was also observed on CIFAR10, when training with large budgets, e.g., 12 or 16. In order to make presented method embodiments work for the 16-pixel evaluation setup, two-step MC targeted attack (in this case the step size is 8) was used. Besides, it was found that training without label adversary performed very bad, further demonstrating the effectiveness of label adversary. In one or more experimental settings, both the non-targeted attack and the targeted attack were used in evaluation where the target label was uniformly randomly selected. It shall be noted that the non-targeted attack is much stronger than the randomly targeted attack, so it was believed using both will lead to a more reliable robustness evaluation. One or more experiments on challenging datasets showed that presented method embodiments significantly outperformed some prior art (H. Kannan, et al., Adversarial logit pairing, *arXiv preprint arXiv:*1803.06373, 2018) against randomly targeted attacks. Compared with the recent work (C. Xie, et al., Feature denoising for improving adversarial robustness, *arXiv preprint arXiv:*1812.03411, 2018), the presented model embodiments were better on clean accuracy and against non-targeted attacks.

5. Diagnostic Experiments

In this subsection, two more diagnostic experiments on CIFAR10 were provided: black-box attack evaluation and the effect of number of training images on the model robustness.

5.1 Black-Box Attack Evaluation

In one or more experimental settings, the adversarial robustness of the presented R-MC-LA model embodiments against black-box attacks was evaluated. Two source models were chosen to generate the adversarial examples: the undefended model and another randomly initialized R-MC-LA model. All the models were trained using $\epsilon_z=8$. The results are shown in Table 9. It was observed that when the source model was the undefended model, the CE20 was slightly weaker than FGSM, this is because generally one-step attacks have better transferability than multi-step attacks. If the source model became the R-MC-LA model, it was found that CE20 was stronger than FGSM.

TABLE 9

The classification accuracy of R-MC-LA models against
black-box attacks on CIFAR10. $\beta = 9$ was used in experiments

| Acc. (%) | clean | Undefended | | Another R-MC-LA | |
|---|---|---|---|---|---|
| | | FGSM | CE20 | FGSM | CE20 |
| R-MC-LA | 90.7 | 87.8 | 88.8 | 74.4 | 71.0 |
| R-MC-LA+ | 91.2 | 88.5 | 89.9 | 74.6 | 74.4 |

5.2 Effect of Number of Training Images

In one or more experimental settings, the number of training images per class was varied. The results were shown in Table 10. The results are aligned with previous claim that adversarial training requires more data than regular training.

TABLE 10

The classification accuracy of R-MC-LA models, trained using different
data size on CIFAR10. The number in the parenthesis means the number
of images per class. $\epsilon_x = 8$, $\beta = 9$ were used in experiments.

| Acc. (%) | clean | FGSM | CE20 | CE100 | CW100 |
|---|---|---|---|---|---|
| R-MC-LA (5K) | 90.7 | 69.6 | 55.3 | 53.8 | 52.8 |
| R-MC-LA (2K) | 85.6 | 56.1 | 42.8 | 41.1 | 40.2 |
| R-MC-LA (0.5K) | 73.3 | 33.7 | 25.1 | 24.5 | 24.0 |

TABLE 11

The classification accuracy of R-MC-LA models against white-box
attacks on CIFAR100. The models are trained using different
perturbation budget. $\beta = 11$ was used in experiments.

| Acc. (%) | clean | FGSM | CE20 | CE100 | CW100 |
|---|---|---|---|---|---|
| R-MC-LA ($\epsilon_x = 8$) | 68.7 | 30.5 | 23.2 | 22.7 | 20.6 |
| R-MC-LA + ($\epsilon_x = 8$) | 66.2 | 31.3 | 23.1 | 22.4 | 20.0 |
| R-MC-LA9 ($\epsilon_x = 8$) | 68.7 | 33.7 | 23.1 | 22.0 | 20.1 |
| R-MC-LA9 + ($\epsilon_x = 8$) | 68.2 | 36.9 | 26.7 | 25.3 | 22.1 |
| Madry* | 61.9 | 28.8 | 23.7 | 23.4 | 24.5 |

6. CIFAR100 Dataset

In this subsection, results against white-box attacks on CIFAR100 dataset were reported. The dataset has 100 classes, 50K training images and 10 K test images. In addition to the basic R-MC-LA models, a slightly modified version, denoted by R-MC-LA9, was also tried. Specifically, in one or more experimental settings, when generating the adversarial label, the $\epsilon_y$ was distributed to the top-9 non-ground-truth classes with largest loss, instead of to all the non-ground-truth classes. This modification brought several percentage of gains. The results were shown in Table 11. It was observed that presented model embodiments outperform the state-of-the-art on clean image and against FGSM, and perform comparably on multi-step attacks. It shall be noted that CIFAR100 is more difficult than CIFAR10 for adversarial training because of much fewer images per class.

F. Some Conclusions

Disclosed herein are embodiments of an approach using adversarial image and adversarial label during adversarial training to decrease training time and increase model robustness against adversarial attacks. In one or more embodiments, the adversarial image is generated by one-step or two-step MC targeted attack. The adversarial labels are computed using an close-form methodology. Comprehensive experiments on various datasets and against various white-box attacks have demonstrated the efficacy of embodiment of adversarial training methods on improving model robustness and decrease training time compared with the standard model.

G. System Embodiments

In embodiments, aspects of the present patent document may be directed to, may include, or may be implemented on one or more information handling systems/computing systems. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, phablet, personal digital assistant (PDA), smart phone, smart watch, smart package, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 7:
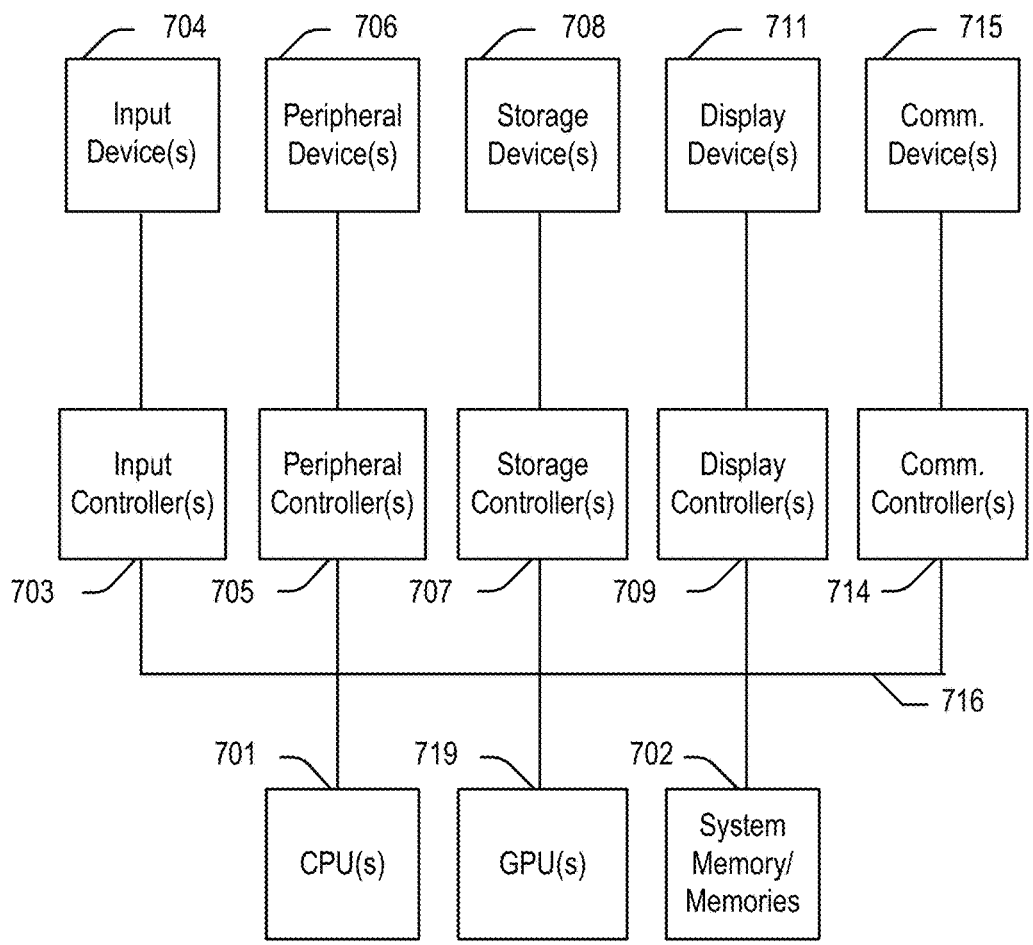
FIG. 7 depicts a simplified block diagram of a computing device/information handling system, in accordance with embodiments of the present disclosure.

FIG. 7 depicts a simplified block diagram of a computing device/information handling system (or computing system) according to embodiments of the present disclosure. It will be understood that the functionalities shown for system 700 may operate to support various embodiments of a computing system—although it shall be understood that a computing system may be differently configured and include different components, including having fewer or more components as depicted in FIG. 7.

As illustrated in FIG. 7, the computing system 700 includes one or more central processing units (CPU) 701 that provides computing resources and controls the computer. CPU 701 may be implemented with a microprocessor or the like, and may also include one or more graphics processing units (GPU) 719 and/or a floating-point coprocessor for mathematical computations. System 700 may also include a system memory 702, which may be in the form of random-access memory (RAM), read-only memory (ROM), or both.

A number of controllers and peripheral devices may also be provided, as shown in FIG. 7. An input controller 703 represents an interface to various input device(s) 704, such as a keyboard, mouse, touchscreen, and/or stylus. The computing system 700 may also include a storage controller 707 for interfacing with one or more storage devices 708 each of which includes a storage medium such as magnetic tape or disk, or an optical medium that might be used to record programs of instructions for operating systems, utilities, and applications, which may include embodiments of programs that implement various aspects of the present invention. Storage device(s) 708 may also be used to store processed data or data to be processed in accordance with the invention. The system 700 may also include a display controller 709 for providing an interface to a display device 711, which may be a cathode ray tube (CRT), a thin film transistor (TFT) display, organic light-emitting diode, electroluminescent panel, plasma panel, or other type of display. The computing system 700 may also include one or more peripheral controllers or interfaces 705 for one or more peripherals 706. Examples of peripherals may include one or more printers, scanners, input devices, output devices, sensors, and the like. A communications controller 714 may interface with one or more communication devices 715, which enables the system 700 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 716, which may represent more than one physical bus. However, various system components may or may not be in physical proximity to one another. For example, input data and/or output data may be remotely transmitted from one physical location to another. In addition, programs that implement various aspects of the invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for training an image classification model to improve robustness, the method comprising:
    receiving a dataset of clean images and corresponding ground-truth labels, each ground-truth label comprising a probability distribution across a plurality of classifications comprising a ground-truth class and one or more non-ground-truth classes;
    generating perturbed images based on the clean images by applying adversarial image attacks;
    for each ground-truth label, generating a perturbed label based on the ground-truth label by altering the probability distribution in a probability simplex by performing steps comprising:
        decreasing a probability for the ground-truth class by a perturbation amount; and
        dividing the perturbation amount among at least one of the one or more non-ground-truth classes, in which a non-ground-truth class receives a portion of the perturbation amount based on a gradient of a classification loss with respect to that non-ground-truth class; and
    training the image classification model using the perturbed images and the corresponding perturbed labels.

2. The computer-implement method of claim 1 wherein the perturbed images are generated in one or two project gradient descent steps.

3. The computer-implement method of claim 2 wherein the perturbed images are generated, for each clean image, by adding random noise within a predetermined image perturbation budget to the clean image.

4. The computer-implement method of claim 3 wherein the image classification model, once trained, is robust to adversarial image attacks that are targeted attacks.

5. The computer-implement method of claim 1 wherein the step of generating perturbed images based on the clean images by applying adversarial image attacks comprises, for each clean image:
generating an initial image by adding random noise within a predetermined image perturbation budget to the clean image; and
generating a perturbed image by applying at least one-step projected gradient descent using a gradient of a classification loss function with respect to the initial image.

6. The computer-implement method of claim 1 wherein the perturbation amount is no more than a predetermined perturbation budget.

7. The computer-implemented method of claim 6 wherein the one or more non-ground-truth classes comprise a most confusing class, the most confusing class having a minimum gradient of the classification loss among the one or more non-ground-truth classes.

8. The computer-implement method of claim 7 wherein the most confusing class has a probability set as a minimal value that is smaller than the predetermined perturbation amount, and each of the one or more non-ground-truth classes other than the most confusing class has a probability that is related to the gradient of the class.

9. The computer-implement method of claim 7 wherein each of one or more non-ground-truth classes other than the most confusing class has a probability directly proportional to the gradient of a classification loss with respect to its non-ground-truth class.

10. A computer-implemented method for training an image classification model to improve robustness, the method comprising:
receiving a clean image and a corresponding ground-truth label, the ground-truth label is represented as a ground-truth label representation comprising a probability distribution in a probability simplex among a ground-truth class and one or more non-ground-truth classes;
generating an initial image by altering the clean image within a predetermined image perturbation budget;
forming a targeted label representation which replaces the ground truth class with a selected non-ground-truth class, in which the selected non-ground-truth class is a most confusing class having a minimum gradient of a classification loss among the one or more non-ground-truth classes;
generating a perturbed image by applying at least one step projected gradient descent using a gradient of a classification loss function with respect to the initial image, the classification loss function being a function of an image, the targeted label representation, and parameters of the image classification model; and
training the image classification model using at least the perturbed image.

11. The computer-implement method of claim 10 wherein the at least one step projected gradient descent is one step projected gradient descent.

12. The computer-implement method of claim 10 wherein the probability of the ground-truth class is at least a certain factor times larger than a maximal probability over non-ground-truth classes.

13. The computer-implement method of claim 10 further comprising:
generating a perturbed label from the ground-truth label by decreasing a probability for the ground-truth class by a perturbation amount no more than a predetermined perturbation budget and distributing the perturbation amount among at least one of the one or more non-ground-truth classes, in which a non-ground-truth class receives a portion of the perturbation amount based on the gradient of a classification loss with respect to that non-ground-truth class; and
training the image classification model using both the perturbed image and the perturbed label.

14. The computer-implement method of claim 13 wherein distributing the predetermined perturbation budget among at least one of the one or more non-ground-truth classes comprises setting a share for the most confusing class as a minimal value.

15. A computer-implemented method for training a neural network model to improve robustness, the method comprising:
receiving a dataset comprising a plurality of elements and corresponding ground-truth label representations for the elements, each ground-truth label representation represents a probability distribution across a ground-truth class and one or more non-ground-truth classes;
generating, for each ground-truth label representation, a perturbed label representation based on the ground-truth label representation by altering the probability distribution for the ground-truth label representation based on a gradient of a classification loss with respect to at least one of the one or more non-ground-truth classes, by performing steps comprising:
decreasing a probability for the ground-truth class by a perturbation amount; and
dividing the perturbation amount among at least one of the one or more non-ground-truth classes, in which a non-ground-truth class receives a portion of the perturbation amount based on the gradient of a classification loss with respect to that non-ground-truth class; and
training the neural network model using at least the perturbed label representations.

16. The computer-implement method of claim 15 wherein the neural network model is an image classification model and the plurality of elements are clean images.

17. The computer-implement method of claim 16 further comprising:
for each clean image:
generating an initial image by adding random noise within a predetermined image perturbation budget to the clean image; and
generating a perturbed image by applying at least one-step projected gradient descent using a gradient of a classification loss function with respect to the clean image; and
wherein the step of training the neural network model using at least the perturbed label representations comprises training the image classification model using both the perturbed images and the perturbed label representations.

18. The computer-implement method of claim 15 wherein each of the ground-truth label representations is a vector representing each ground-truth label representation as a one-hot vector with the probability, at least initially, corresponding to the ground-truth class as 1 and probabilities for the one or more non-ground-truth classes as 0.

19. The computer-implement method of claim 15 wherein the perturbation amount is not more than a predetermined perturbation budget and wherein the step of generating, for each ground-truth label representation, a perturbed label representation further comprises:
choosing a most confusing class from among the one or more non-ground-truth classes, the most confusing class having a minimum gradient of the classification loss among the one or more non-ground-truth classes; and setting, for the most confusing class, a value that is smaller than the perturbation amount; and wherein the step of dividing the perturbation amount among at least one of the one or more non-ground-truth classes, in which a non-ground-truth class receives a portion of the perturbation amount based on the gradient of a classification loss with respect to that non-ground-truth class comprises:

dividing the perturbation amount minus the value assigned to the most confusing class among at least one of the one or more non-ground-truth classes.

20. The computer-implement method of claim 15 wherein the neural network model, once trained, is robust to adversarial image attacks that are white-box attacks.

\* \* \* \* \*